UNITED STATES PATENT OFFICE.

HERVEY DEXTER THATCHER, OF POTSDAM, NEW YORK.

BAKING-POWDER.

SPECIFICATION forming part of Letters Patent No. 422,464, dated March 4, 1890.

Application filed December 23, 1889. Serial No. 334,736. (No specimens.)

*To all whom it may concern:*

Be it known that I, HERVEY DEXTER THATCHER, a citizen of the United States, residing at Potsdam, in the county of St. Lawrence and State of New York, have invented a certain new and useful Improvement in Baking-Powders; and I do declare that the following specification is a full, clear, and exact description thereof.

Baking-powders combining potassic bitartrate (cream of tartar) and sodic bicarbonate (bicarbonate of sodium) with flour, starch, carbonate of ammonium, alum, tartaric acid, and other substances have been made in a great variety of combinations. All substances heretofore added to the cream of tartar and bicarbonate of sodium are without value except to preserve the mixture from becoming hard and lumpy. It takes, however, so much of the flour and starch to prevent the mixture from becoming hard that carbonate of ammonium in a greater or less quantity has often been added; but carbonate of ammonium is objectionable as a food. Starch, again, is objectionable, because it prevents the free combination of the cream of tartar with the bicarbonate of sodium.

To the end, therefore, of overcoming the objections above pointed out, as well as others which are apparent, my invention consists, broadly, in the combination, with the ordinary ingredients of a good baking-powder—viz., cream of tartar and an alkaline bicarbonate, mixed in the usual proportions—of a small quantity of crystallized saccharine material in a finely-pulverized state. As illustrations of those substances in which this crystallized or crystallizable saccharine material is to be had, I name, first, sugar of milk obtained wholly from milk; second, cane-sugar obtained chiefly in a direct form from the sugar-cane plant, the beet-root, and the sugar-maple, and indirectly from various other substances by conversion, and, third, grape-sugar obtained chiefly from grapes and honey. This latter sugar is, however, not practically available by reason of the difficulty with which it is made to assume the crystalline form. Of these substances the sugar of milk and the cane-sugar are both easily crystallized; but inasmuch as the sugar of milk affords the harder crystals it is the more satisfactory for the purpose of this invention; hence in this description I employ the term "sugar of milk" with the understanding that it yields the best form of crystallized saccharine material; but I wish it distinctly understood that all crystalline forms of sugar will give satisfactory results and are embraced within my present invention. The incorporation of this ingredient in a pulverulent form not only prevents the mixture from becoming hard and lumpy, but also serves to more thoroughly comminute the particles of the ingredients of the baking-powder above named, and aiding, indeed, in making the same an ideally-perfect panificator.

In making my baking-powder I have found the following formula to give excellent results, viz: cream of tartar, sixty-four parts; bicarbonate of sodium, thirty-two parts; sugar of milk, four parts. I prefer these proportions; but by experiment I have found that so small an amount of sugar of milk as two per cent., or even less, when thoroughly mixed with the cream of tartar and bicarbonate of soda, will prevent the mixture from becoming hard and lumpy, acting as a perfect keeper, comminuter, and preservative of the other ingredients of the powder. Moreover, the sugar of milk which I use, being made from cow's milk, is perfectly wholesome as a food product, being without any deleterious effect upon the health of the user. It is manifest, therefore, that more or less of the crystalline saccharine material could be used without departing from the spirit of my invention.

And now, therefore, having fully described my invention, what I claim as new, and desire to secure by Letters Patent of the United States, is—

The improved baking-powder herein described, consisting of cream of tartar, an alkaline bicarbonate, and sugar of milk, in proportions substantially as set forth.

HERVEY DEXTER THATCHER.

Witnesses:
LE ROY JOSEPH BROWNELL,
WILLIAM TAGGART HINMAN.